United States Patent [19]

Uemoto et al.

[11] Patent Number: 5,200,905
[45] Date of Patent: Apr. 6, 1993

[54] ELECTRIC DISCHARGE MACHINING CONTROL APPARATUS

[75] Inventors: Kazuhiko Uemoto; Koji Akamatsu; Nobuaki Ohba, all of Aichi

[73] Assignee: Mitsubishi Denki K.K., Tokyo, Japan

[21] Appl. No.: 563,650

[22] Filed: Aug. 7, 1990

[30] Foreign Application Priority Data

Aug. 9, 1989 [JP] Japan .................... 1-206058

[51] Int. Cl.$^5$ .................... G06F 15/46; B23H 1/00
[52] U.S. Cl. .................... 364/474.04; 219/69.13; 364/148; 395/61; 395/900; 395/904
[58] Field of Search .................... 364/474.04, 474.01, 364/474.02, 474.15, 474.22–474.27, 148; 318/561; 219/69.11–69.2; 395/904, 51, 61, 900

[56] References Cited

U.S. PATENT DOCUMENTS

| | | | |
|---|---|---|---|
| 4,071,729 | 1/1978 | Bell, Jr. .................... | 364/474.04 X |
| 4,504,722 | 3/1985 | Kishi et al. .................... | 219/69.13 X |
| 4,533,811 | 8/1985 | Buhler .................... | 219/69.17 |
| 4,559,434 | 12/1985 | Kinoshita .................... | 219/69.17 |
| 4,628,435 | 12/1986 | Tashiro et al. .................... | 395/904 X |
| 4,864,490 | 9/1989 | Nomoto et al. .................... | 364/148 X |
| 4,985,824 | 1/1991 | Husseiny et al. .................... | 364/187 |
| 5,006,992 | 4/1991 | Skeirik .................... | 364/148 X |
| 5,012,430 | 4/1991 | Sakurai .................... | 364/148 X |

FOREIGN PATENT DOCUMENTS

| | | |
|---|---|---|
| 042687 | 11/1990 | European Pat. Off. . |
| 3228258 | 11/1985 | Fed. Rep. of Germany . |
| 63-62001 | 3/1988 | Japan . |

OTHER PUBLICATIONS

Lu et al–"A Machine Learning Approach to The Automatic Synthesis of Mechanistic Knowledge for Engineering Decision-Making"–(AI EDAM) (1987) 1(2), pp. 109–118–Academic Press Limited.

Sakai et al.–"A Fuzzy Controller in Turning Process Automation"–Industrial Applications of Fuzzy Control–M. Sugeno (E.D.)–Elsevier Science Publishers B.V. (North-Holland), 1985, pp. 139–151.

German journal: M. Weck, J. M. Dehmer, "Digitale adaptive Regelung des Funkenerosionsprozesses", in VDI-Z 131 (1989) No. 2, Feb., pp. 39–44.

Journal of the Society of Instrument and Control Engineers 1989 1. vol. 22.

Primary Examiner—Joseph Ruggiero
Attorney, Agent, or Firm—Sughrue, Mion, Zinn, Macpeak & Seas

[57] ABSTRACT

An electric discharge machining control apparatus in which the know how of a skilled person can be readily written which concerns the setting of machining conditions such as pause time, discharge duration time, servo reference voltage, and speed gain which are necessary for maintaining optimum electric discharge machining conditions and for offering a maximum electric discharge machining efficiency, as well as the criterions to the instability of electric discharge machining conditions. According to the know how, the machining control is carried out in a most suitable manner, and can be automatically adjusted when required.

5 Claims, 16 Drawing Sheets

```
<METHOD I>

IF
        EFFECTIVE DISCHARGE RATE IS SMALL, MOVEMENT
        OF ELECTRODE DURING MACHINING IS LARGE IN
        AMPLITUDE, MACHINING DEPTH IS DEEP,
    SERVO REF. VOLT. IS MADE HIGHER.

<METHOD II>

IF
        EFFECTIVE DISCHARGE RATE IS LARGE, MOVEMENT
        OF ELECTRODE DURING MACHINING IS SMALL IN
        AMPLITUDE, MACHINING DEPTH IS SHALLOW,
    SERVO REF. VOLT. IS MADE LOWER.
```

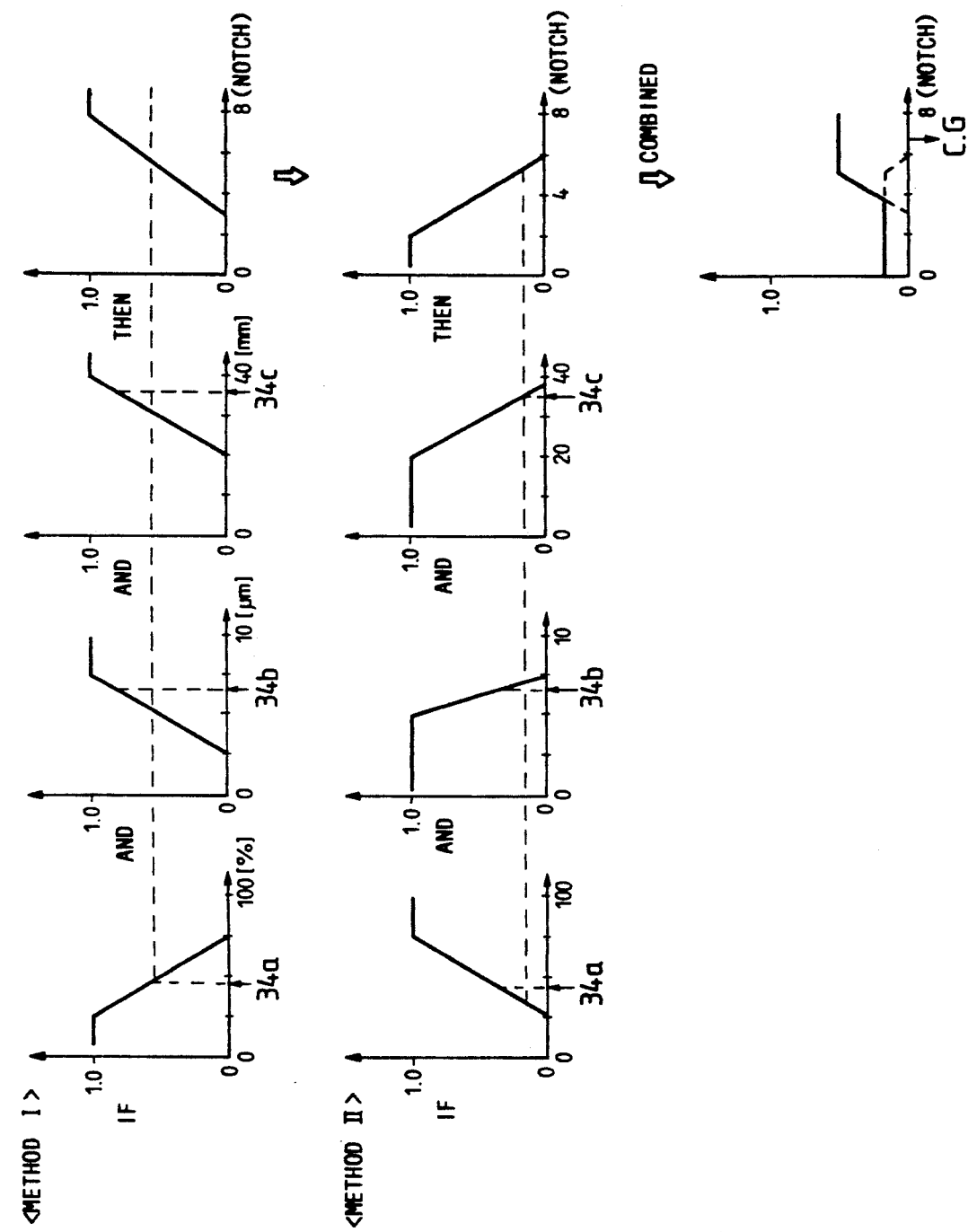

FIG. 22

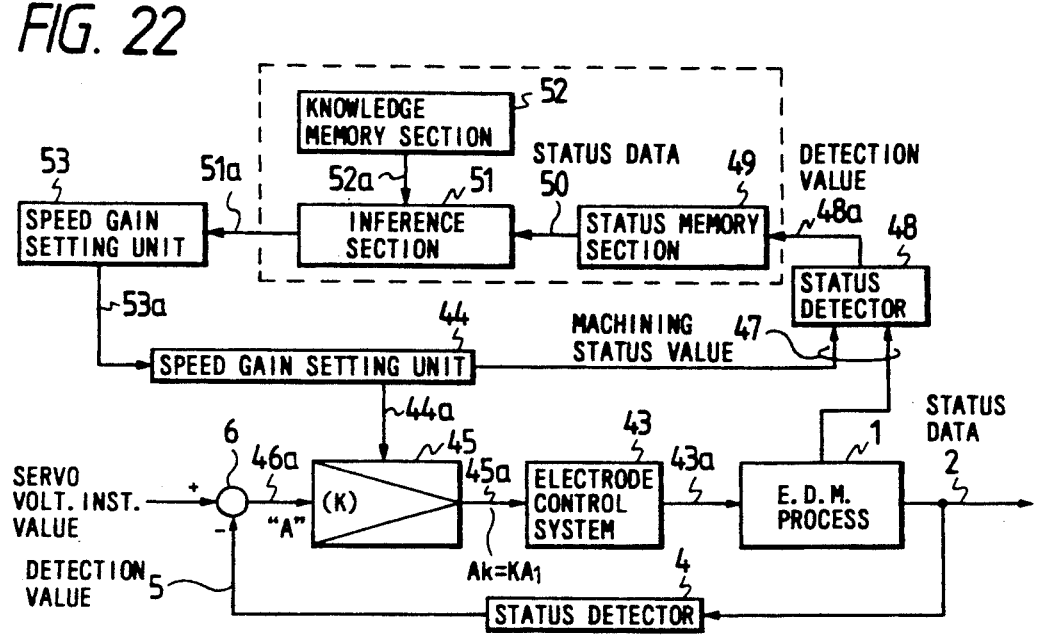

FIG. 23

```
<METHOD I>
    IF
        SPEED GAIN IS INCREASED, EFFECTIVE DISCHARGE RATE IS SMALL,
        AND MOVEMENT OF ELECTRODE DURING MACHINING IS LARGE IN AMPLITUDE,
    THE SPEED GAIN IS DECREASED.

<METHOD II>
    IF
        SPEED GAIN IS INCREASED, EFFECTIVE DISCHARGE RATE IS LARGE,
        AND MOVEMENT OF ELECTRODE DURING MACHINING IS SMALL IN AMPLITUDE,
    THE SPEED GAIN IS INCREASED.

<METHOD III>
    IF
        SPEED GAIN IS DECREASED, EFFECTIVE DISCHARGE RATE IS SMALL,
        AND MOVEMENT OF ELECTRODE DURING MACHINING IS LARGE IN AMPLITUDE,
    THE SPEED GAIN IS INCREASED.

<METHOD IV>
    IF
        SPEED GAIN IS DECREASED, EFFECTIVE DISCHARGE RATE IS LARGE,
        AND MOVEMENT OF ELECTRODE DURING MACHINING IS SMALL IN AMPLITUDE,
    THE SPEED GAIN IS DECREASED.
```

ELECTRIC DISCHARGE MACHINING CONTROL APPARATUS

BACKGROUND OF THE INVENTION

This invention relates to an electric discharge machining control apparatus which, during electric discharge machining, maintains optimum electric discharge machining conditions and performs control operations to maximize the electric discharge machining efficiency.

In an electric discharge machining operation, in order to maintain the electric discharge machining conditions stable and to improve the electric discharge machining efficiency, it is necessary to suitably control a pause time, electric discharge time, servo reference voltage, and spindle feed speed (spindle feed speed gain) during machining.

FIG. 1 is a block diagram showing a conventional electric discharge machining control apparatus according to a pause time control system.

In FIG. 1, reference numeral 1 designates an electric discharge machining process including electric discharge phenomena; 2, status data of electric discharge machining process; 3, a machining power source; 4, a status detector for detecting the status data 2; 5, the detection value of the status detector; 6, a pause time setting unit; 7, the instruction value provided by the setting unit 6; 8, a pause time controller for controlling a pause time in response to the instruction value provided by the pause time setting unit 6 and to the detection value 5 of the status data of electric discharge machining process outputted by the status detector 4; and 9, the pause time data provided by the pause time controller 8.

The operation of the conventional electric discharge machining control apparatus thus organized will be described.

The operator sets a pause time, one of the electric discharge machining conditions, with the pause time setting unit b, to perform an electric discharge machining operation. During discharge machining, the gap between a machining electrode and a workpiece is generally narrow, of the order of 10 to 50 μm. As the machining advances, waste material such as small particles is formed and caught in the gap, so that electric discharges take place with the waste material with the result that secondary electric discharge or abnormal electric discharge is liable to occur. This is due to the fact that the quantity, of waste material formed is larger than the quantity of waste material which can be removed. This difficulty is eliminated as follows: When such abnormal condition is detected, the pause time is increased according to the abnormal condition thus detected, thereby to prevent the accumulation of waste material in the discharge gap.

The status detector 4 detects the status data 2 of process, and applies the occurrence of abnormal electric discharge, as the detection value 5, to the pause time controller 8. In response to the detection value 5 provided by the status detector 4 and the instruction value provided by the pause time setting unit 6, the pause time controller 8 controls the pause time. The pause time data 9 is applied to the machining power source 3.

As is apparent from the above description, controlling the pause time is essential for maintaining the electric discharge machining conditions stable. However, the method lowers the machining efficiency; that is, it wastes the time to be used for the machining operation. Thus, in order to improve the machining efficiency, it is essential to control the pause time effectively. For this purpose, it is necessary to determine pause increasing or decreasing conditions according to the pulse conditions of the machining power source, the configuration of the machining electrode, and the materials of the machining electrode and the workpiece in combination. This determination depends greatly on the know how of a skilled operator. Such a skilled operator monitors how unstable the electric discharge machining conditions are, to adjust the pause time.

FIG. 2 is a block diagram showing a conventional electric discharge machining control apparatus according to an electric discharge duration control system. In FIG. 2, reference numeral 1 designates an electric discharge machining process including an electric discharge phenomenon; 2, status data of electric discharge machining process; 3, a machining power source; 4, a status detector for detecting the status data 2; 10, an electric discharge duration setting unit 10 for setting an electric discharge duration; 11, an instruction value provided by the electric discharge duration setting unit; 12, an electric discharge duration controller for controlling the electric discharge duration according to an instruction value provided by the electric discharge duration setting unit 10 and the detection value 5 of the status data of electric discharge machining process which is provided by the status detector 4; 13, electric discharge duration data provided by the controller 12.

The operation of the control apparatus thus organized will be described.

In an electric disel1arge machining operation using an electrode of graphite material, the operator sets an electric discharge duration time, one of the machining conditions, with the electric discharge duration setting unit 10. Because of electric discharge machining characteristics, as the electric discharge duration time increases, the amount of consumption of the electrode is decreased, and the machining accuracy is increased; however, if the electric discharge duration time is increased excessively, then the occurrence of electric discharges concentrates at a corner of the electrode, as a result of which secondary electric discharge or abnormal electric discharge is liable to occur. Furthermore, in the electric discharge machining operation using the graphite electrode, as shown in FIG. 3 protrusions 41 is formed at a corner of the electrode 40, thus making it impossible to continue the machining operation. In order to eliminate this difficulty the following method is employed: When the abnormal electric discharge is detected, the electric discharge duration time is decreased so that the protrusions formed at the corner of the electrode are consumed. Under this condition, the machining operation is continued until it becomes stable. After all the protrusions have been removed, the machining conditions are restored. By repeatedly carrying out the above-described operation, not only the consumption of the electrode but also the machining time can be minimized. The status detector 4 for detecting abnormal electric discharges operates to detect, for instance, the amplitude in movement of the electrode or the upward movement of the electrode from the machining deepest point during electric discharge machining.

The status detector 4 detects the status data 2 of process, and applies the occurrence of abnormal electric discharge, as the detection value 5, to the electric discharge duration controller 12. The latter 12 controls an electric discharge duration according to the instruction value provided by the electric discharge duration setting unit 10 and the status data of electric discharge machining process provided by the status detector 4, to provide electric discharge duration data 13, which is applied to the machining power source 3.

As is apparent from the above description, controlling the electric discharge duration is essential for stabilization of a electric discharge machining operation; however, it is not always preferable in terms of machining accuracy; that is, in order to improve the machining efficiency, it is essential to control the electric discharge duration effectively. For this purpose, it is necessary to determine electric discharge duration increasing or decreasing conditions according to the pulse conditions of the machining power source, the configuration of the machining electrode, and the materials of the machining electrode and the workpiece in combination. In general, this determination depends greatly on the know how of a skilled operator. Such a skilled operator monitors the instability of the electric discharge machining conditions, and adjusts the electric discharge duration time.

FIG. 4 is a block diagram showing a conventional electric discharge machining control apparatus of servo reference voltage control system. In FIG. 4, reference numeral 1 designates an electric discharge machining process including electric discharge phenomenon; 2, the status data of electric discharge machining process; 14, an electrode control system; 15, a distance signal corresponding to the machining gap between a workpiece and a machining electrode which is adjusted by the electrode control system; 4, a status detector for detecting the status data 2; 5, a detection value provided by the status detector; 16, a servo reference voltage setting unit for setting a servo reference voltage for an electric discharge machining operation; 17, an instruction value (Vref) provided by the unit 16; and 18, an arithmetic unit for obtaining the difference 18a between the instruction value (Vref) and the detection value 5. The difference 18a is applied to the electrode control system 14. The system 14 adjusts the machining gap distance signal 15 so that the difference 18a is zeroed.

FIGS. 5 and 6 show the relationships between the servo reference voltage instruction value Vref and inter-electrode voltage waveforms. In these figures, reference character $V_M$ designates an inter-electrode average voltage, and $T_M$, a no-load time. In the case of FIG. 5, the servo reference voltage instruction value Vref is high, while in the case of FIG. 6, it is low. In the case where the servo reference voltage instruction value Vref is high as shown in FIG. 6, the inter-electrode average voltage $V_M$ is high, and the no-load time $T_M$ is long; that is, an electric discharge standby time from the application of an inter-electrode voltage is long, as a result of which the distance 15 of the machining gap is large. On the other hand, in the case where the servo reference voltage instruction value Vref is low as shown in FIG. 5, the inter-electrode average voltage $V_M$ is low, and the no-load time $T_M$ is short; that is, an electric discharge standby time from the application of an inter-electrode voltage is short, as a result of which the distance 15 of the machining gap is small. Thus, when the servo reference voltage instruction value Vref is increased, then the distance 15 of the machining gap is increased, as a result of which the waste material formed during machining can be removed with ease, and the machining operation becomes stable accordingly; however, the machining speed is decreased. When, on the other hand, the servo reference voltage instruction value Vref is decreased, then the distance 15 of the machining gap is decreased, it becomes rather difficult to remove the waste material, and the machining operation is rather unstable; however, the machining speed is increased.

In general, before the start of an electric discharge machining operation, the operator determines the servo reference voltage value according machining contents such as a machining depth, an electrode configuration, a machining solution supplying method, and the materials of an electrode and a workpiece, and set is with the servo reference voltage setting unit 16.

As is apparent from the above description, the servo reference voltage value is essential for maintaining the electric discharge machining conditions stable and for increasing the machining speed. Thus, it is important to set the servo reference voltage to a most suitable value. That is, the servo reference voltage value should be determined according to variations in machining depth, machining power source pulse conditions, an electrode area confronting a workpiece, a machining solution supplying method, and the materials of an electrode and a workpiece in combination. In general, this determination depends greatly on the know how of a skilled operator. He monitors the instability of the electric discharge machining conditions, to adjust the servo reference duration time.

FIG. 7 is a block diagram showing a conventional electric discharge machining control apparatus of speed gain control system. In FIG. 7, reference numeral 1 designates an electric discharge machining process including a electric discharge phenomenon; 2, the status data of electric discharge machining process; 4, a status detector for detecting the status data of the process; 5, a detection value of the status data of the process; 43, an electrode control system; 43a, the response speed of the electrode controlled by the electrode control system; 44, a speed gain setting unit for setting a spindle feed speed gain for a machining operation; 44, a set value provided by the unit 44a; 45, an amplifier for applying a speed gain to a spindle feed speed instruction value; 45a, a feed speed instruction value amplified with the speed gain; 46, an arithmetic unit for performing an arithmetic operation with the detection value 4 of the status data fed back to the servo voltage instruction value; and 46a, the output of the arithmetic unit 46.

The operation of the electric discharge machining control apparatus thus organized will be described.

Before an electric discharge machining operation, a speed gain, one of the machining conditions, is set with the speed gain setting unit 44. In the electric discharge machining operation, the reference servo voltage instruction value, and the detection value of the status data which is detected by the status detector 4 are applied to the arithmetic unit 46, the output 46a of which is applied to the amplifier 45. In the amplifier 45, the input A (i.e., the output 46a of the arithmetic unit 46) is amplified with a gain K set by the speed gain setting unit 44. The output 45a ($A_K = K A$) of the amplifier is applied to the electron control system 43. The latter 43 changes an electrode forward/backward response speed 43a according the output 45a of the amplifier, thereby to control the electrode in the machining process 1.

FIGS. 8 and 9 show the relationships between an inter-electrode voltage waveform and a gain set value 44a. In these figures, reference character $T_M$ designates a no-load time. When the speed gain is low, as shown in FIG. 6 the no-load time $T_M$ changes. This is because, when the speed gain is low, the electrode response speed is decreased, as a result of which it becomes impossible for the electrode to follow the inter-electrode variation in the preceding electric discharge machining process, and correction of the variation takes time. Thus, the machining speed is decreased.

In the case where the speed gain is high, as shown in FIG. 9 the electrode response speed is high, and the electrode can follow the inter-electrode variation with ease. Accordingly, the time required for eliminating the inter-electrode variation caused in the preceding electric discharge machining process is short. That is, as shown in FIG. 9, the no-load time $T_M$, or standby time until electric discharges are induced, is reduced, so that the machining speed is increased. However, if the speed gain is too high, then the electrode follows the inter-electrode variation excessively; that is, it is oscillated, thus making it impossible to perform the machining operation.

At the start of an electrode discharge machining operation, the operator sets the speed gain with the speed gain setting unit according to a machining depth, an electrode configuration, a machining solution supplying method, and the materials of an electrode and a workpiece in combination.

As is apparent from the above-description, setting the speed gain is essential for maintaining the electric discharge machining conditions stable and for increasing the machining speed. Thus, it is important to set the speed gain to its most suitable value in order to improve the machining efficiency. That is, the speed gain should be determined according to variations in machining depth, machining power source pulse conditions, an electrode area confronting a workpiece, a machining solution supplying method, and the materials of an electrode and a workpiece in combination. In general, this determination depends greatly on the know how of a skilled operator. He monitors the instability of the electric discharge machining conditions, to adjust the speed gain.

The conventional electric discharge machining control apparatus is constructed as described above. Hence, in the case where a pause time, discharge duration time, servo reference voltage, and speed gain are set according to the know how of a skilled person for best pause time control, best discharge duration time control, best servo, reference voltage control, and best speed gain control, it is difficult to write the quantitative, fuzzy expressions included in the know how as methods of suitably controlling a pause time, discharge duration time, servo reference voltage, and spindle feed speed, and accordingly the resultant methods include personal errors. In the case where the pause time, discharge duration time, servo reference voltage, and speed gain are controlled automatically, not by the skilled person, according to the instability of electric discharge machining conditions, it is difficult to correctly write the criterions given by the skilled person. Thus, the conventional electric discharge machining control apparatus has problems to be solved for improvement of the electric discharge machining efficiency.

SUMMARY OF THE INVENTION

Accordingly, an object of this invention is to eliminate the above-described difficulties accompanying a conventional electric discharge machining control apparatus. More specifically, an object of the invention is to provide an electric discharge machining control apparatus in which the know how of a skilled person can be readily written which concerns the setting of machining conditions (such as pause time, discharge duration time, servo reference voltage, and speed gain) which are necessary for maintaining optimum electric discharge machining conditions and for providing maximum electric discharge machining efficiency, as well as the criterions to the instability of electric discharge machining conditions, and in which according to the know how, the machining control is carried out in a most suitable manner, and can be automatically adjusted when required. An electric discharge machining control apparatus according to the invention comprises: control means for controlling at least one of the machining conditions such as a pause time, electric discharge duration, servo reference voltage and feed speed in an electric discharge machining operation; knowledge memory means for storing methods effective in allowing the control means to control the machining condition; status detecting means for detecting machining status data from an electric discharge machining process which are required at least for the methods; status memory means for storing at least one of the present and past machining status data detected by the status detecting means; and inference means for combining a plurality of results which are obtained from machining status data read out of the status memory means and methods read out of the knowledge memory means in association with the machining status data thus read, to provide an instruction value for the control of the machining condition by the control means.

In the apparatus according to the invention, methods effective in controlling machining conditions such as a pause time, discharge duration servo reference voltage and speed gain are stored in the knowledge memory means, and machining status data required for the methods are detected by the status detecting means and the detection values are stored in the status memory means, and the inference means combines a plurality of results which are obtained according to the methods stored in the knowledge memory means and the machining status data stored in the status memory means, to provide instruction values for controlling the machining conditions most suitably or changing them when required, to control the control means. Hence, with the apparatus of the invention, the electric discharge machining conditions are held optimum, and the electric discharge machining operation is carried out with high machining efficiency. Furthermore, with the apparatus, the know how of skilled persons which is effective in controlling the machining condition optimumly can be suitably and readily described although it includes qualitative fuzzy expressions. In addition, with the apparatus, it can be automatically achieved to control the machining conditions optimumly and to change them when required.

BRIEF DESCRIPTION OF THE DRAWINGS

In the accompanying drawings:

FIG. 21 is an explanatory diagram showing a fuzzy inference process of the methods shown in FIG. 19;

FIG. 22 is a block diagram showing the entire arrangement of a fourth example of the electric discharge machining control apparatus according to this invention;

FIG. 23 is an explanatory diagram showing methods effective in performing a speed gain control operation in the apparatus shown in FIG. 22;

DESCRIPTION OF THE PREFERRED EMBODIMENTS

Preferred embodiments of this invention will be described with reference to the accompanying drawings.

FIGS. 10 through 13 show a first example of an electric discharge machining control apparatus which performs a pause time control operation to maintain optimum electric discharge machining conditions, and to maximize an electric discharge machining efficiency.

Figure 1:
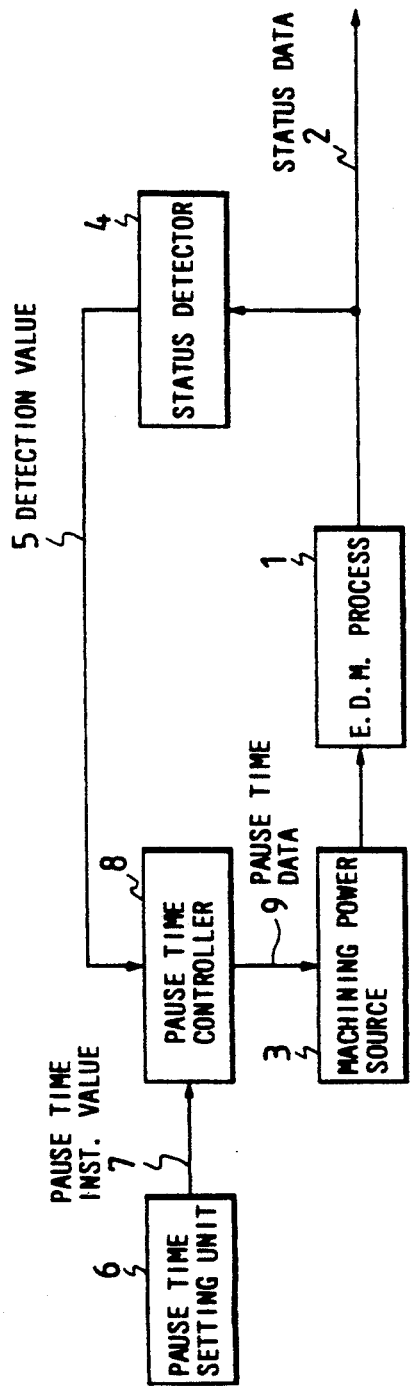
FIG. 1 is a block diagram showing the arrangement of a conventional electric discharge machining control apparatus of pause time control system.
Figure 2:
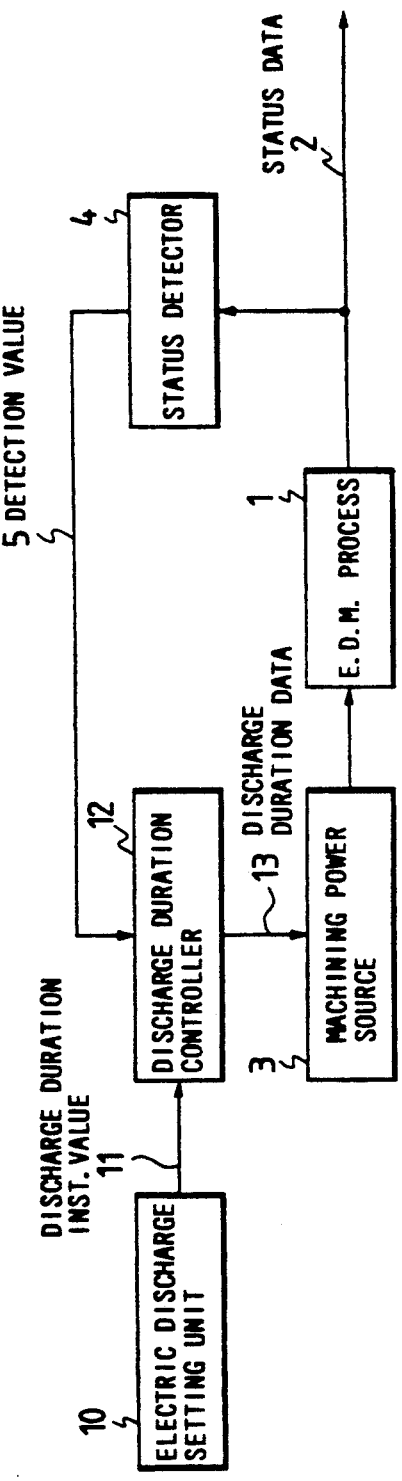
FIG. 2 is a block diagram showing the arrangement of a conventional electric discharge machining control apparatus of electric discharge duration control system.
Figure 3:
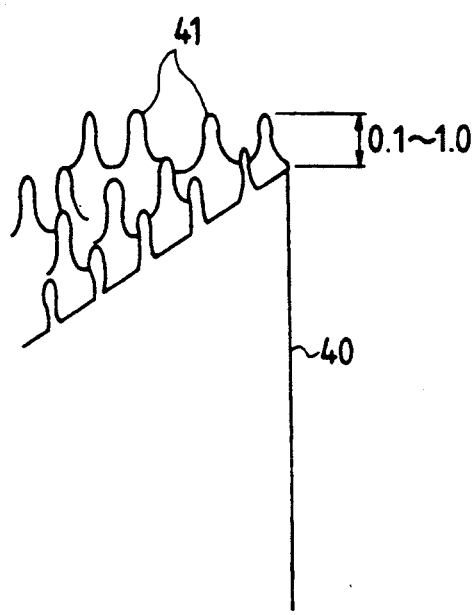
FIG. 3 is an explanatory diagram showing the corner of an electrode.
Figure 4:
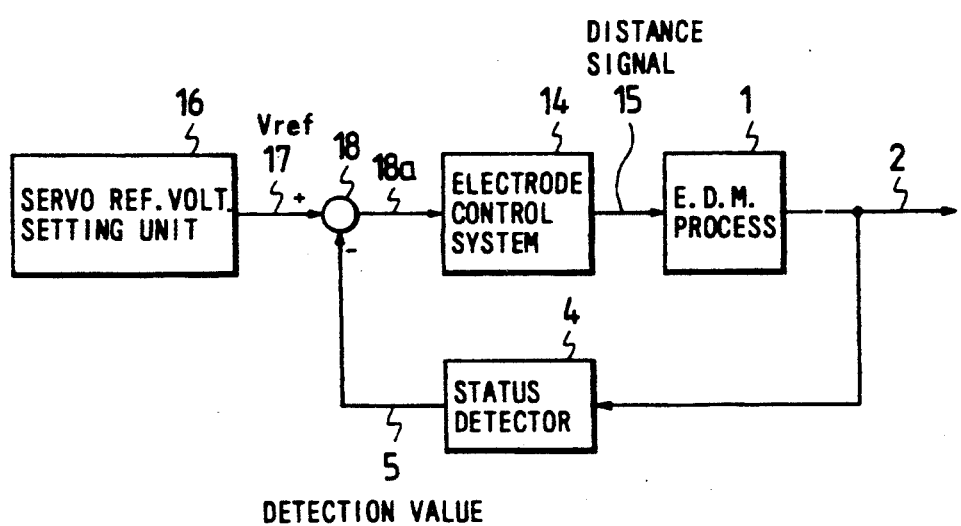
FIG. 4 is a block diagram showing the arrangement of a conventional electric discharge machining control apparatus of servo reference voltage control system.
Figure 5:
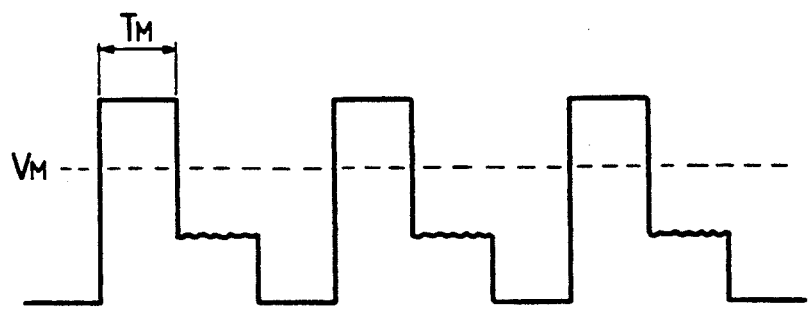
FIGS. 5 and 6 are waveform diagrams showing inter-electrode voltage waveforms.
Figure 6:
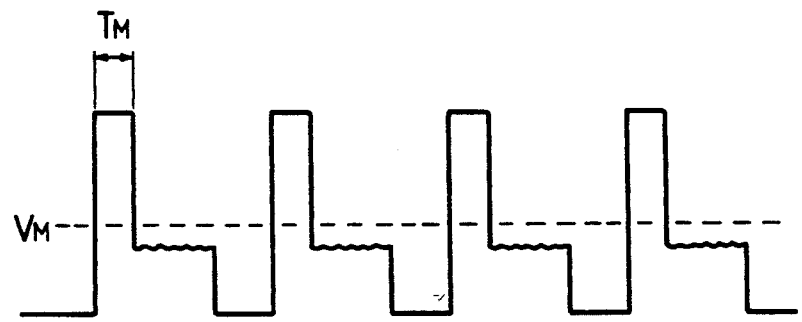
Figure 8:
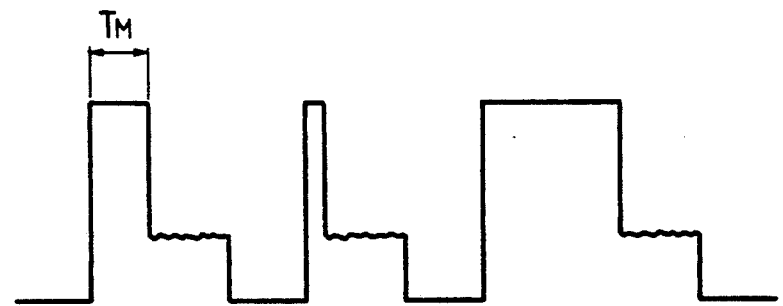
FIG. 8 is a waveform diagram showing an inter-electrode voltage waveform in the case where a speed gain is low.
Figure 9:
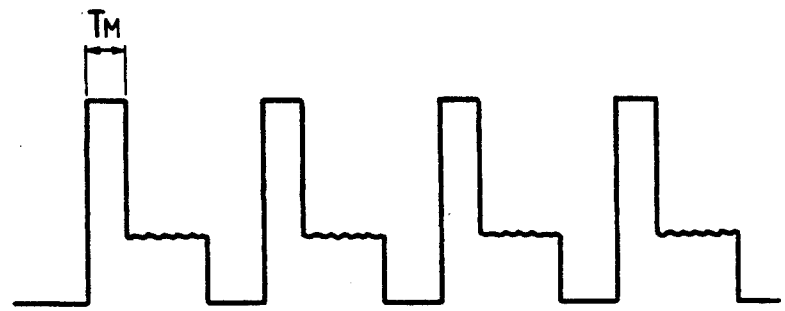
FIG. 9 is a waveform diagram showing an inter-electrode voltage waveform in the case where the speed gain is high.
Figure 7:
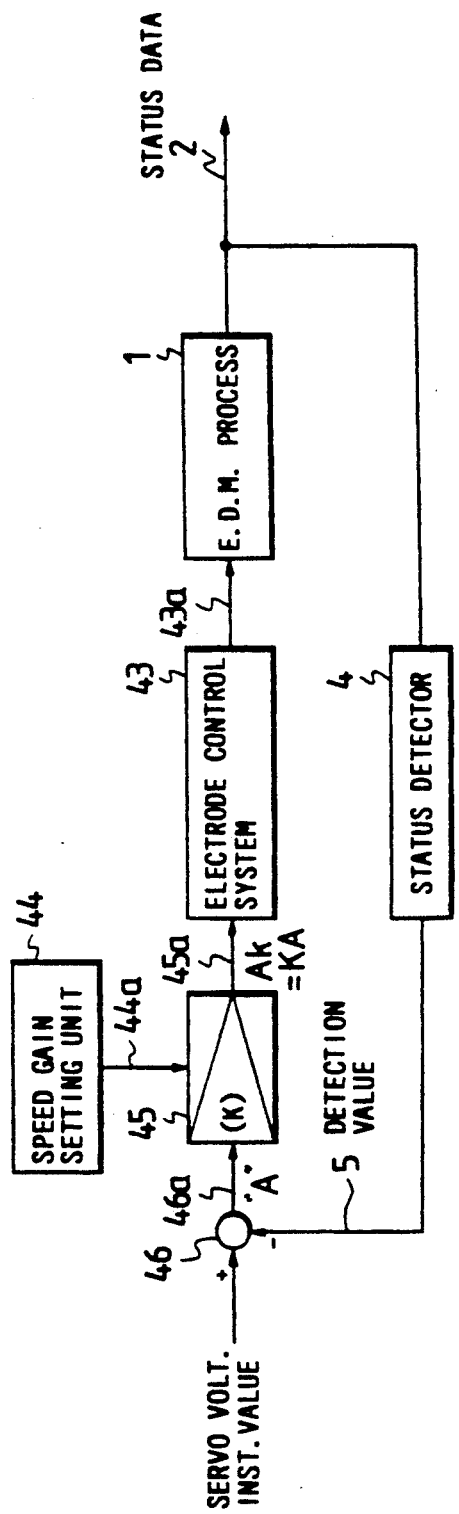
FIG. 7 is a conventional electric discharge machining control apparatus of speed gain control system.
Figure 10:
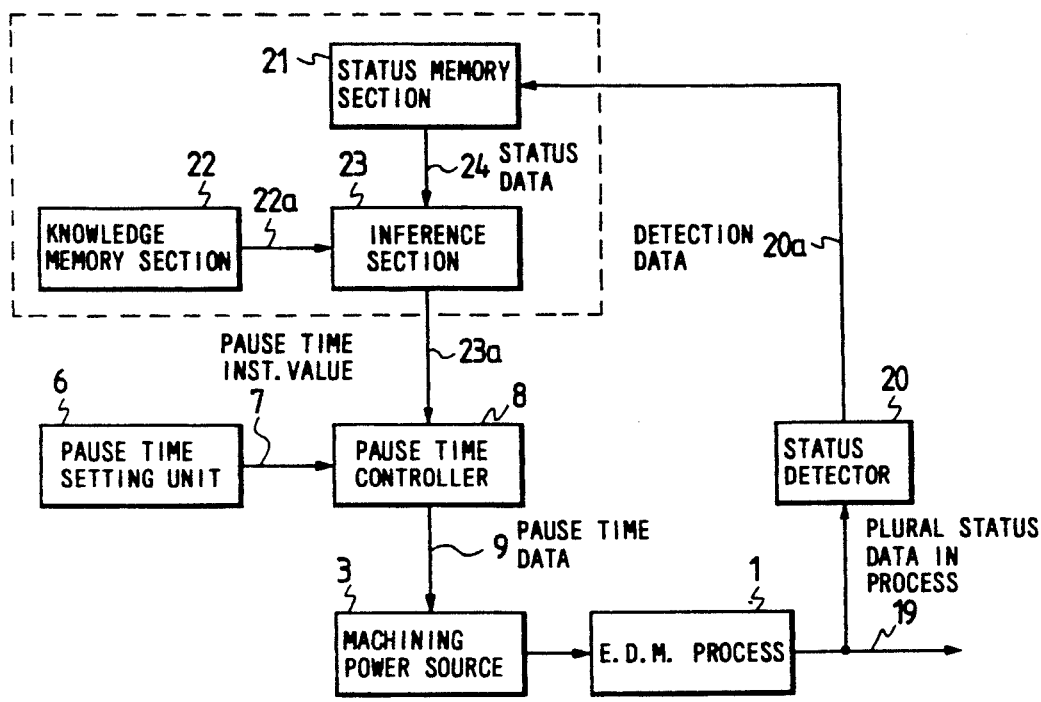
FIG. 10 is a block diagram showing the entire arrangement of a first example of an electric discharge machining control apparatus according to this invention.

FIG. 10 shows the entire arrangement of the apparatus. In FIG. 10, reference numeral 1 designates an electric discharge machining process including an electric discharge phenomena; 3, a machining power source 3 for supplying machining electric power for the electric discharge machining process 1; 6, a pause time setting unit for setting a pause time for an electric discharge machining operation; and 8, a pause time controller for controlling a pause time according to a pause time instruction value 7 provided by the pause time setting unit 6 and an instruction value 23a provided by an inference section 23 (described later). The pause time controller 8 applies pause time data 9 to the machining power source 3. The electric discharge machining process 1 provides a plurality of machining status data 19 required at least for methods (cf. FIG. 11) effective in performing a pause time controlling operation. The status data 19 is applied to a status detector 20.

The status detector 20 is to detect the machining status data required for the method. The output of the status detector 20, namely, a status detection value 20a is stored in a status memory section 21. The status memory section 21 is for storing at least one of the present and past status detection values 20a. Status data 24 read out of the status memory section 21 is applied to the aforementioned inference section 23.

Figure 11:
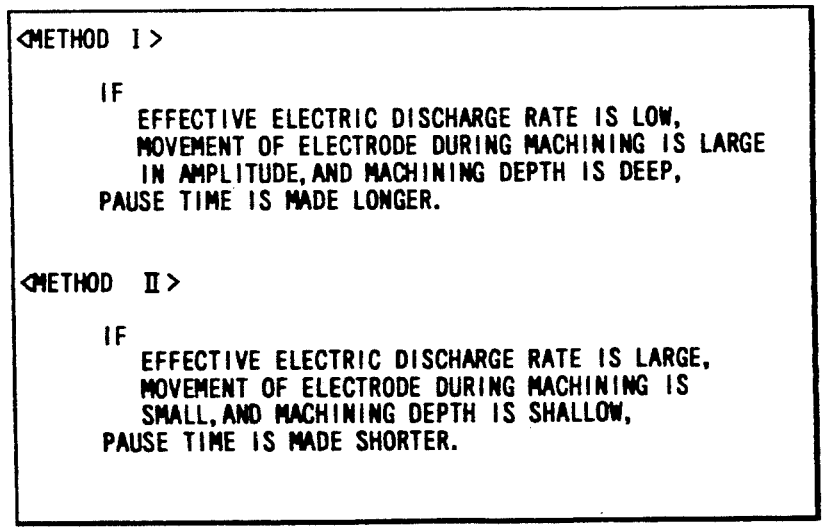
FIG. 11 is an explanatory diagram showing methods effective in performing a pause time control operation in the apparatus shown in FIG. 10.

Further in FIG. 10, reference numeral 22 designates a knowledge memory section for storing methods effective in performing the pause time control (cf. FIG. 11). A method 22a read out of the knowledge memory section 22 is applied to the inference section 23. The inference section 23 operates to collectively determine most suitable pause time control and applicable changes according to the status data 24 received from the status memory section 21 and the method 22a received from the knowledge memory section 22. An instruction value 23a for the most suitable time control determined by the inference section 23 is applied to the pause time controller 8.

The sections 21, 22 and 23 encircled by the broken line in FIG. 10 provide the most suitable pause time control instruction value 23a, playing an essential part in the invention.

The operation of the embodiment thus organized; that is, an operation of forming the instruction value 23a for most suitable pause time control will be described.

FIG. 11 shows methods effective in performing the pause time control, methods I and II. These methods I and II can be readily and appropriately described by using the fuzzy set theory. For instance, the methods I and II can be stored in the knowledge memory section 22 in a rule form consisting of an IF front part and a THEN rear part according to a fuzzy set shown in FIG. 12.

Figure 12:
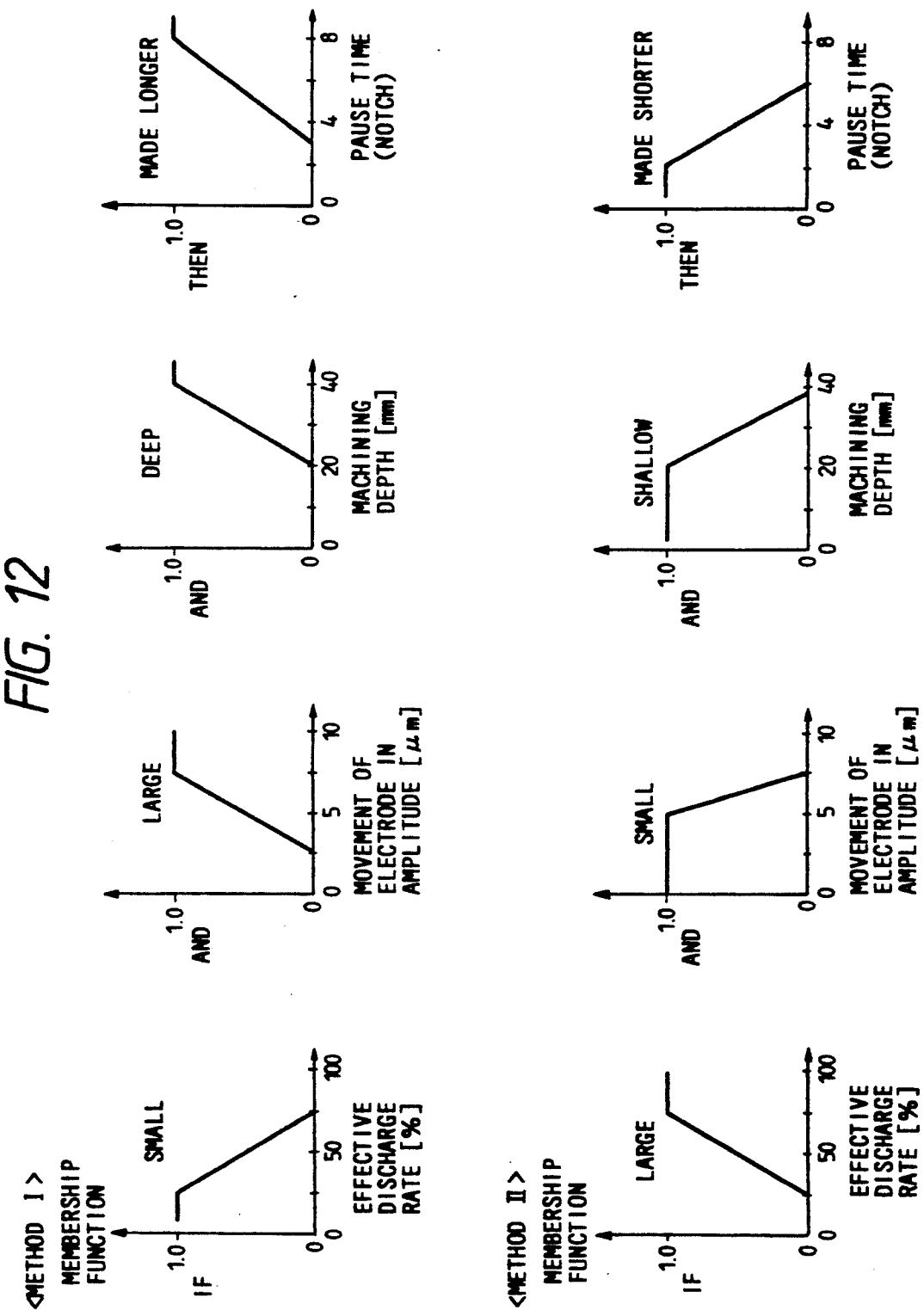
FIG. 12 is an explanatory diagram showing the methods of FIG. 11 which are described according to the fuzzy set theory.

More specifically, qualitative fuzzy expressions such as "effective electric discharge rate is low", "movement of an electrode during machining is large in amplitude", "machining depth is large" and "pause time is long"

included in the method I, and "effective electric discharge rate is high", "movement of an electrode during machining is small in amplitude", "machining depth is small" and "pause time is short" included in the method II are described with membership functions as shown in FIG. 12.

For instance, the feature "effective electric discharge rate is small" in the method I is described as follows: When the effective electric discharge rate is 25% or less, then it fully satisfies the expression, and therefore the membership function is set to "1". When it is 75% or higher, it does not satisfy the expression at all, and therefore the membership function is set to "0". When it is larger than 25% and smaller than 75%, then it meets the expression with from "0" to "1", and therefore the membership function is set to "0-1". In the same manner, the qualitative, fuzzy expressions "movement of an electrode during machining is small in amplitude", "machining depth is large" and "pause time is long" included in the method I, and "effective electric discharge rate is high", "movement of an electrode during machining is large in amplitude", "machining depth is small" and "pause time is short" included in the method II can be appropriately and readily described by using membership functions.

On the other hand, the status detection value 20a is stored in the status memory section 21 which the status detector 20 provides by detecting the machining status data 19 required for the method stored in the knowledge memory section 22. In the case of FIG. 11, the status detection value includes an effective electric discharge rate, electrode amplitude, and machining depth.

Figure 13:
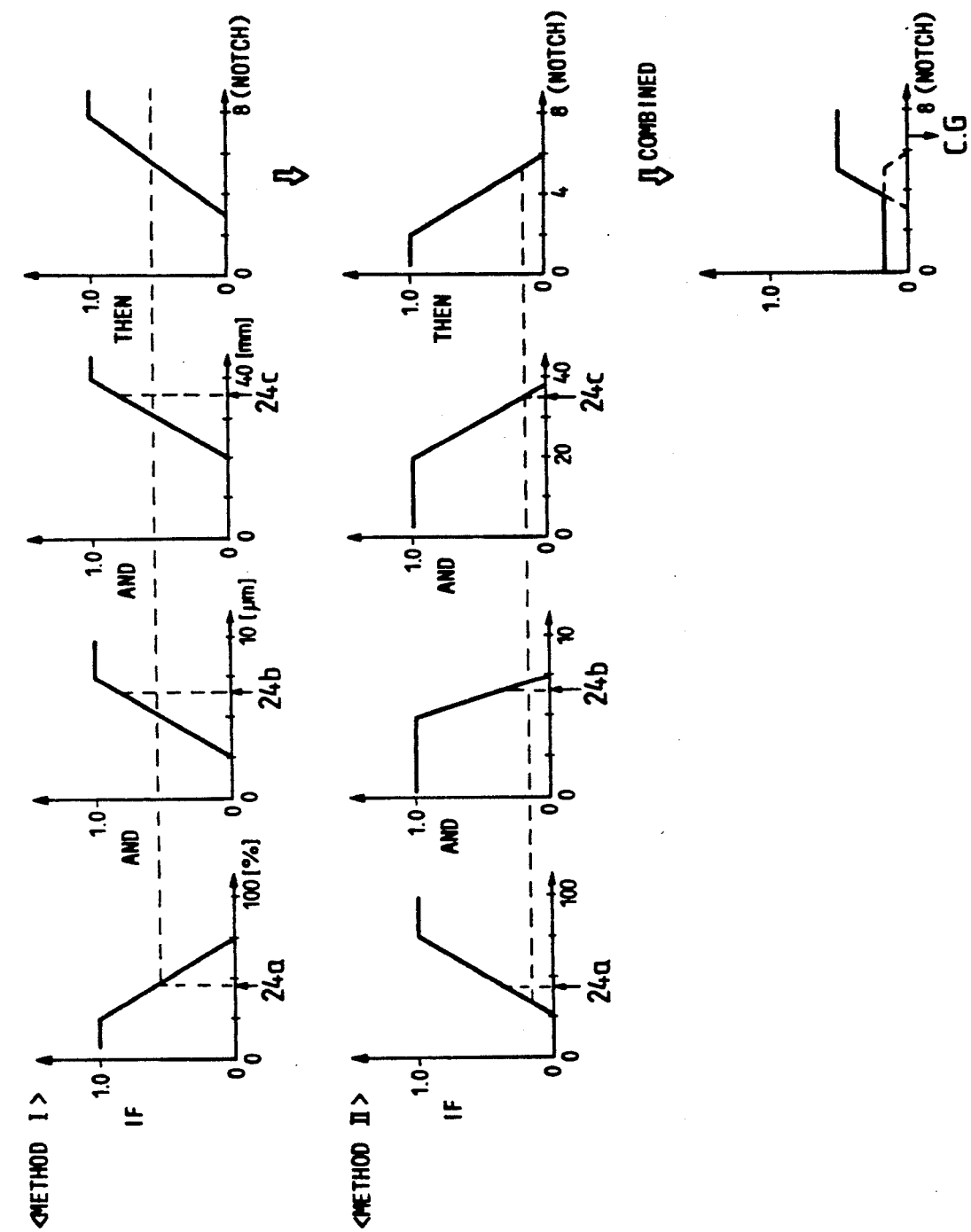
FIG. 13 is an explanatory diagram showing a fuzzy inference process of the methods shown in FIG. 12.

The inference section 23 performs a fuzzy inference according to a procedure shown in FIG. 13 referring to the methods stored in the knowledge memory section 22 and the status stored in the status memory section 21, to determine an instruction value 23a for most suitable pause time control. In FIG. 13, reference characters 24a, 24b and 24c designate the detection values of "effective electric discharge rate", "amplitude in movement of an electrode during machining" and "machining depth" stored in the status memory section 21, respectively. For each of the methods I and II, the fuzzy inference is carried out as follows: It is determined to what extent these status data 24 satisfy the qualitative fuzzy expressions of the front part which are described with the membership functions. The membership function of the rear part is cut with the value of the membership function (the detection value 24a in the case of the method I, and the detection value 24c in the case of the method II) which, in the front part, is minimum in the degree of satisfaction, to determine the upper limit. Under this condition, the membership functions are combined so as to have the largest function values in them, and the area gravity center position C.G. of the resultant membership function is determined. The value of the position thus determined is the instruction value 23a for most suitable pause time control.

In the above-described embodiment, the methods effective in performing the pause time control are stored in the knowledge memory section, the machining status data required at least for the methods are stored in the status memory section 22, and the inference section 23 collectively determines the pause time referring to the methods and the machining status data. Therefore, the know how of a skilled person concerning the pause time control can be written correctly with ease. Furthermore, according to the methods, the pause time control can be performed optimumly, and can be automatically changed when required.

In the first embodiment shown in FIG. 13, the front part of each method describes three machining statuses, and the rear part one pause time control; however, the invention is not limited thereto or thereby. In addition, it goes without saying that, even when the number of methods is increased, similarly an instruction value for most suitable pause time control can be obtained. Changing the pause time according to the degree of instability of electric discharge machining conditions has not been described; however, it can be realized by utilizing the above-described technical concept of the invention in the same manner.

In the above-described embodiment, the fuzzy set is utilized for the knowledge memory section 22, and the fuzzy inference is performed by the inference section 23. However, it goes without saying that knowledge expressions and inference methods employed in other general expert systems can be utilized, with the same effects as in the above-described embodiment.

FIGS. 14 through 17 shows a second example of the electric discharge machining control apparatus according to the invention which performs an electric discharge duration time control operation to maintain optimum electric discharge machining conditions and to maximize an electric discharge machining efficiency.

Figure 14:
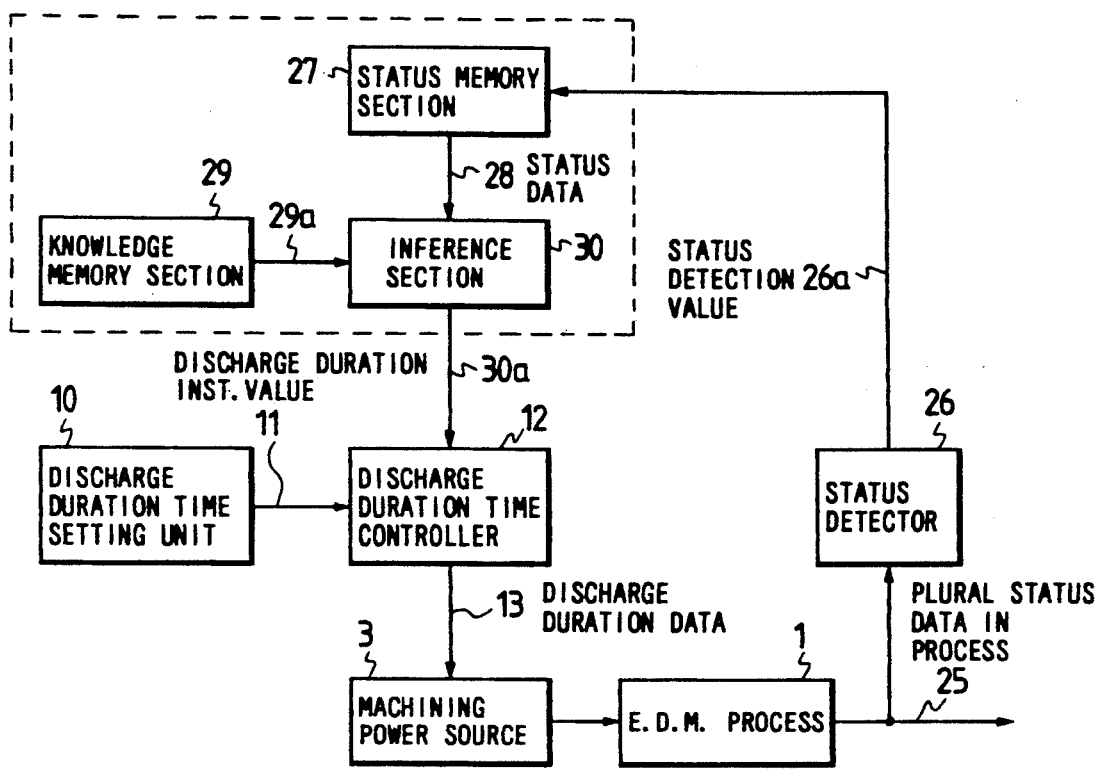
FIG. 14 is a block diagram showing the entire arrangement of a second example of the electric discharge, machining control apparatus according to this invention.

FIG. 14 shows the entire arrangement of the apparatus. In FIG. 14, reference numeral 1 designates an electric discharge machining process including an electric discharge phenomena; 3, a machining power source 3 for supplying machining electric power for the electric discharge machining process 1; 10, an electric discharge duration setting unit for setting an electric discharge duration for an electric discharge machining operation; and 12, an electric discharge duration controller for controlling an electric discharge duration according to an electric discharge duration instruction value 11 provided by the electric discharge duration setting unit 10 and an instruction value 30a provided by an inference section 30 (described later). The electric discharge duration controller 12 applies electric discharge duration data 13 to the machining power source 3. The electric discharge machining process 1 provides a plurality of machining status data 25 required at least for methods (cf. FIG. 15) effective in performing an electric discharge duration control operation. The status data 25 is applied to a status detector 26.

The status detector 26 is to detect the machining status data required for the method. The output of the status detector 26, namely, a status detection value 26a is stored in a status memory section 27. The status memory section 27 is to store at least one of the present and past status detection values 26a. Status data 28 read out of the status memory section 27 is applied to the aforementioned inference section 30.

Figure 15:
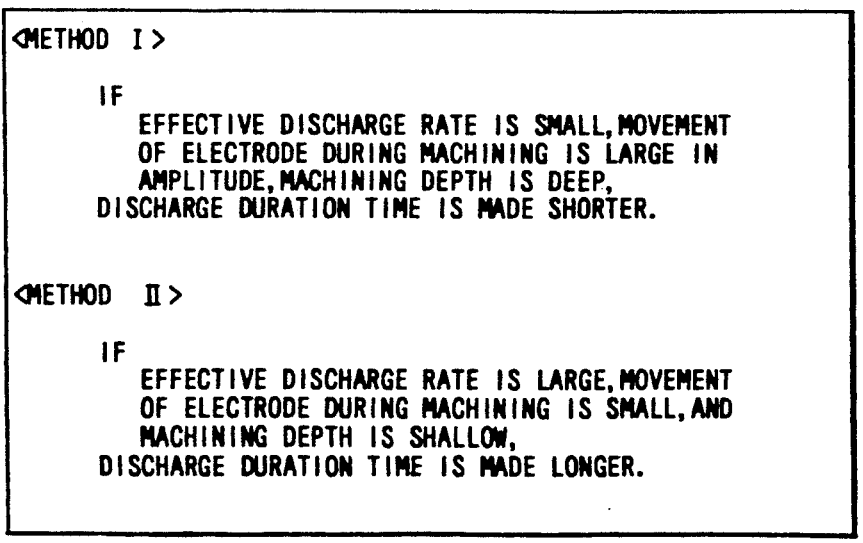
FIG. 15 is an explanatory diagram showing methods effective in performing an electric discharge duration control operation in the apparatus shown in FIG. 14.

Further in FIG. 14, reference numeral 29 designates a knowledge memory section for storing methods effective in performing the pause time control (cf. FIG. 15). A method 29a read out of the knowledge memory section 29 is applied to the inference section 30.

The inference section 30 operates to collectively determine most suitable discharge duration time control and applicable changes according to the status data 28 received from the status memory section 27 and the method 29a received from the knowledge memory section 29. An instruction value 30a for the most suitable time control determined by the inference section 30 is applied to the electric discharge duration controller 12.

The sections 27, 29 and 30 encircled by the broken line in FIG. 14 provides the instruction value 30a for most suitable electric discharge duration control, playing an essential part in the invention.

The operation of the embodiment thus organized; that is, an operation of forming the instruction value 30a for most suitable electric discharge duration control will be described.

FIG. 15 shows methods effective in performing the electric discharge duration control, methods I and II. These methods I and II can be readily and appropriately described by using the fuzzy set theory. For instance, the methods I and II can be stored in the knowledge memory section 29 in a rule form consisting of an IF front part and a THEN rear part according to a fuzzy set shown in FIG. 16.

Figure 16:
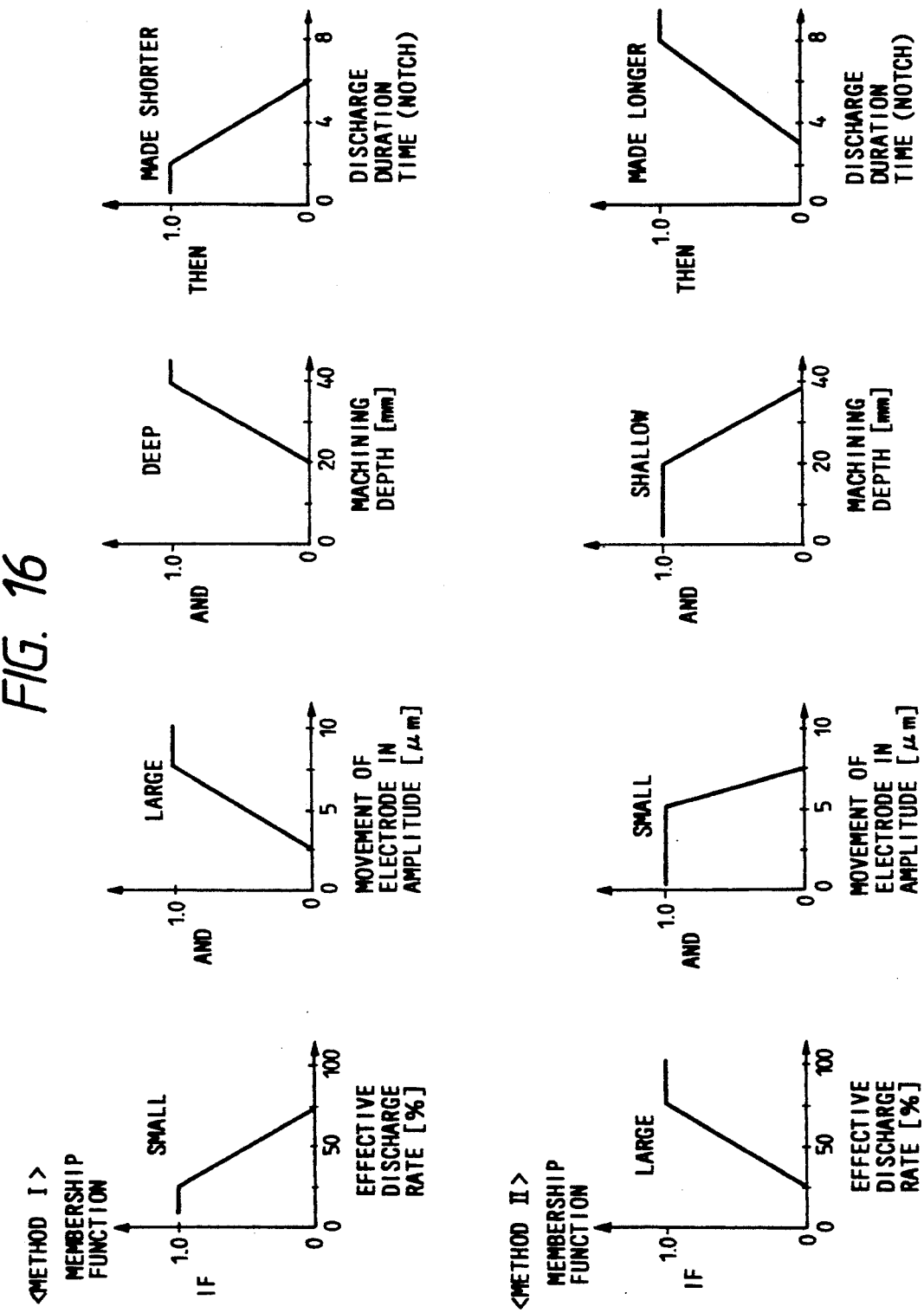
FIG. 16 is an explanatory diagram showing the methods of FIG. 15 which are described according to the fuzzy set theory.

More specifically, qualitative fuzzy expressions such as "effective electric discharge rate is low", "movement of an electrode during machining is large in amplitude", "machining depth is large" and "electric discharge duration is long" included in the method I, and "effective electric discharge rate is high", "movement of an electrode during machining is small in amplitude", "machining depth is small" and "electric discharge duration is short" included in the method II are described with membership functions as shown in FIG. 16.

For instance, the feature "effective electric discharge rate is small" in the method I is described as follows: When the effective electric discharge rate is 25% or less, then it fully satisfies the expression, and therefore the membership function is set to "1". When it is 75% or higher, it does not satisfy the expression at all, and therefore the membership function is set to "0". When it is larger than 25% and smaller than 75%, then it meets the expression with from "0" to "1", and therefore the membership function is set to "0-1". In the same manner, the qualitative, fuzzy expressions "movement of an electrode during machining is large in amplitude", "machining depth is large" and "electric discharge duration is long" included in the method I, and "effective electric discharge rate is high", "movement of an electrode during machining is small in amplitude", "machining depth is small" and "electric discharge duration is short" included in the method II can be appropriately and readily described by using membership functions.

On the other hand, the status detection value 26a is stored in the status memory section 27 which the status detector 26 provides by detecting the machining status data 25 required for the methods stored in the knowledge memory section 29.

In the case of FIG. 15, the status detection value 26a includes an effective electric discharge rate, electrode amplitude, and machining depth.

Figure 17:
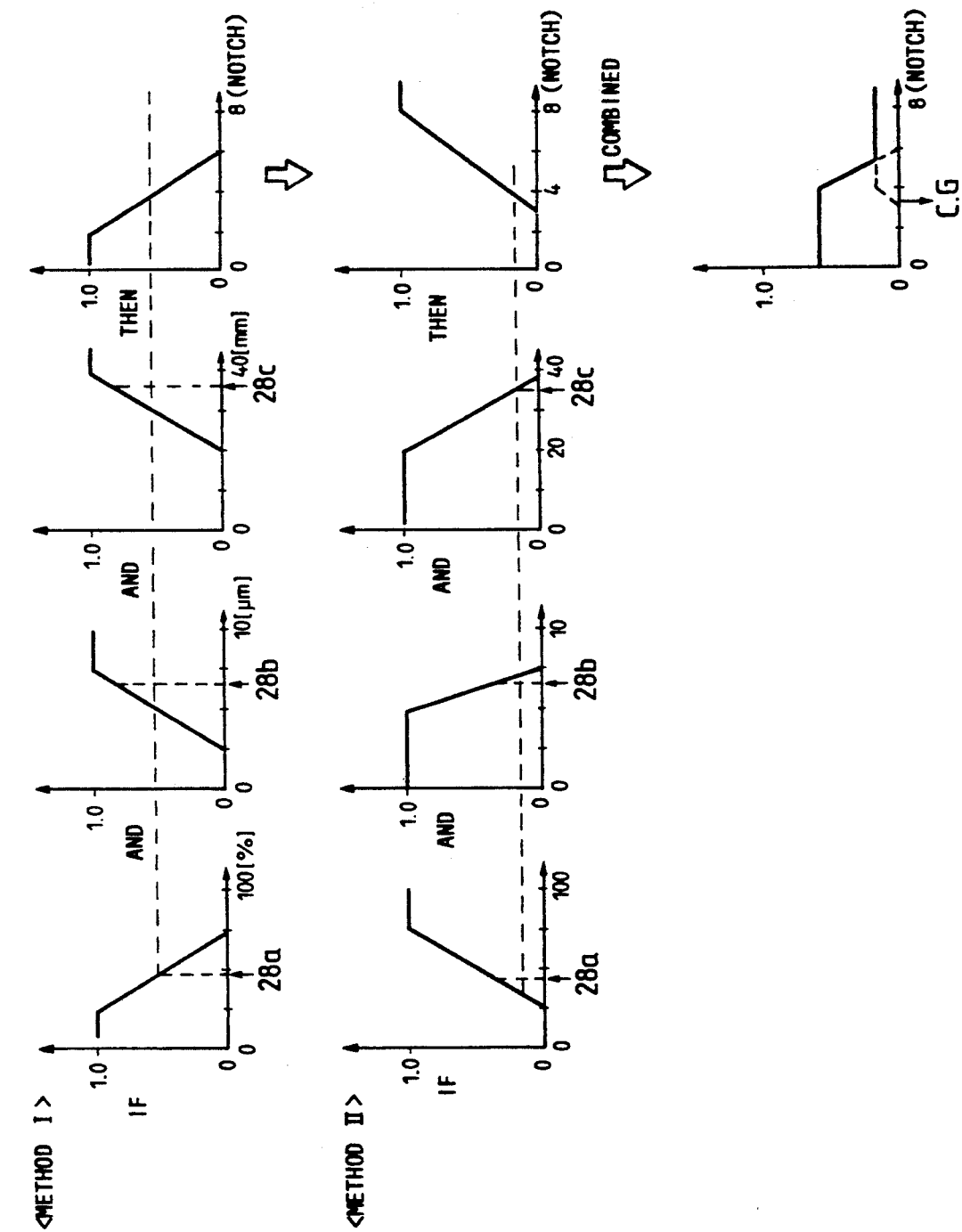
FIG. 17 is an explanatory diagram showing a fuzzy inference process of the methods shown in FIG. 15.

The inference section 30 performs a fuzzy inference according to a procedure shown in FIG. 17 referring to the methods stored in the knowledge memory section 29 and the status stored in the status memory section 27, to determine an instruction value 30a for most suitable electric discharge duration control. In FIG. 17, reference characters 28a, 28b and 28c designate the detection values of "effective electric discharge rate", "amplitude in movement of an electrode during machining" and "machining depth" stored in the status memory section 27, respectively. For each of the methods I and II, the fuzzy inference is carried out as follows: It is determined to what extent these status data 28 satisfy the qualitative fuzzy expressions of the front part which are described with the membership functions. The membership function of the rear part is cut with the value of the membership function (the detection value 28a in the case of the method I, and the detection value 28c in the case of the method II) which, in the front part, is minimum in the degree of satisfaction, to determine the upper limit. Under this condition, the membership functions are combined so as to have the largest function values of them, and the area gravity center position C.G. of the resultant membership function is determined. The value of the position thus determined is the instruction value 30a for most suitable electric discharge duration time control.

In the above-described embodiment, the methods effective in performing the electric discharge duration control are stored in the knowledge memory section 29, the machining status data required at least for the methods are stored in the status memory section 27, and the influence section 30 collectively determines the electric discharge duration referring to the methods and the machining status data. Therefore, the know how of a skilled person concerning the electric discharge duration control can be correctively written with ease. Furthermore, according to the methods, the electric discharge duration control can be performed optimumly, and can be automatically changed when required.

In the second embodiment shown in FIG. 17, the front part of each method describes three machining statuses, and the rear part one electric discharge duration control; however, the invention is not limited thereto or thereby. In addition, it goes without saying that, even when the number of methods is increased, similarly an instruction value for most suitable electric discharge duration control can be obtained. Changing the electric discharge duration according to the degree of instability of electric discharge machining conditions has not been described; however, it can be realized by utilizing the above-described technical concept of the invention in the same manner.

In the above-described second embodiment, the fuzzy set is utilized for the knowledge memory section, and the fuzzy inference is performed by the inference section. However, it goes without saying that knowledge expressions and inference methods employed in other general expert systems can be utilized with the same effects as in the above-described embodiment.

FIGS. 18 through 21 show a third example of the electric discharge machining control apparatus which performs a servo reference voltage control operation to maintain optimum electric discharge machining conditions, and to maximize an electric discharge machining efficiency.

Figures 18, 19:
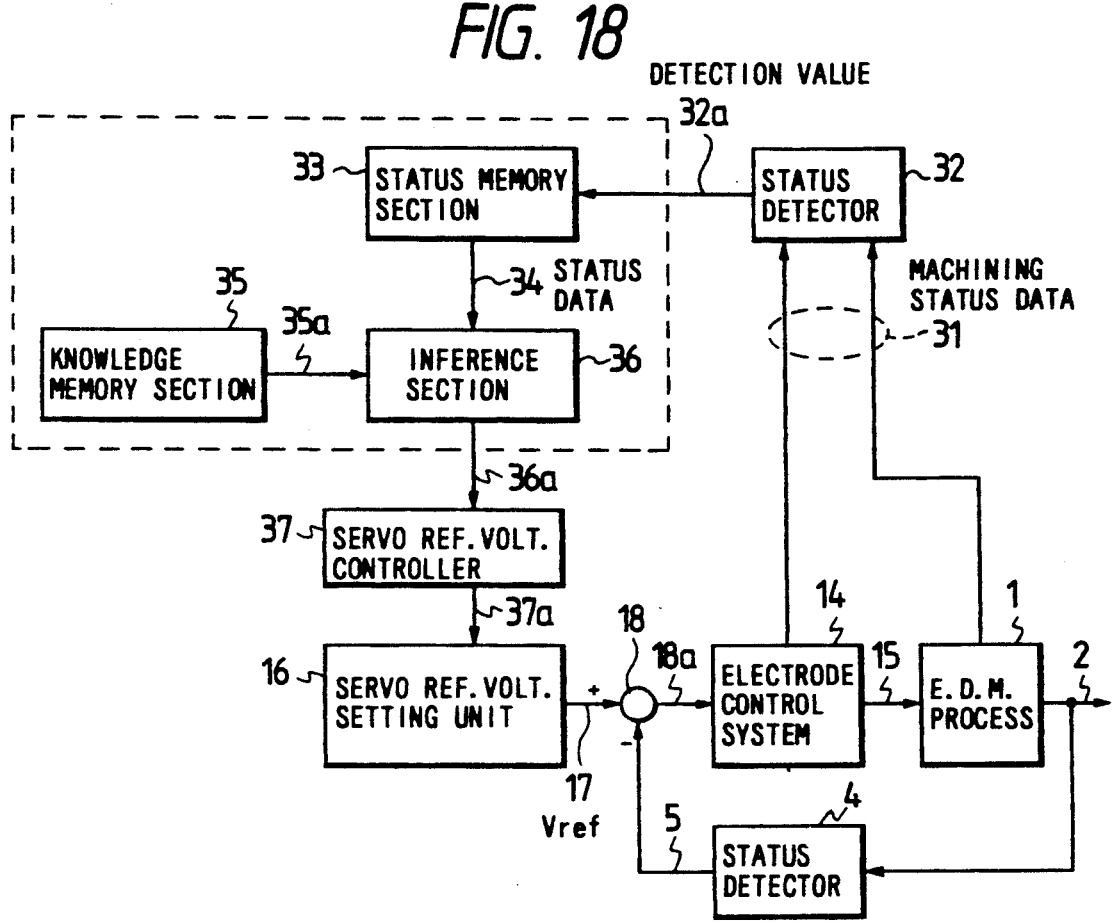
FIG. 18 is a block diagram showing the entire arrangement of a third example of the electric discharge machining control apparatus according to this invention.
FIG. 19 is an explanatory diagram showing methods effective in performing a servo reference voltage control operation in the apparatus shown in FIG. 18.

FIG. 18 shows the entire arrangement of the apparatus. In FIG. 18, reference numeral 1 designates an electric discharge machining process including an electric discharge phenomena; 2, status data provided by the electric discharge machining process 1; and 4, a status detector for detecting the status data 2, to output a detection value 5 which is applied to an arithmetic section 18. Further in FIG. 18, reference numeral 16 designates a servo reference voltage setting unit for setting a servo reference voltage for an electric discharge machining operation. An instruction value 17 (Vref) provided by the setting unit 16 is applied to the arithmetic section 18. The latter 18 provides the difference value 18a between the detection value 5 and the instruction value 17. The difference value 18a is applied to an electrode control system 14. The latter 14 operates to adjust a machining gap distance signal 15 so that the difference value 18a be zeroed.

The electric discharge machining process 1 and the electrode control system 14 provide status data 31 required for methods (cf. FIG. 19) effective in performing a servo reference voltage control. The status data 31 are applied to a status detector 32.

The status detector 32 is to detect the machining status data required for the methods. The output of the status detector 32, namely, a status detection value 32a is stored in a status memory section 33. The status memory section 33 is to store at least one of the present and past status detection values 32a. Status data 34 read out of the status memory section 33 is applied to an inference section 36.

Further in FIG. 18, reference numeral 35 designates a knowledge memory section for storing methods effective in performing the servo reference voltage control (cf. FIG. 19). A method 35a read out of the knowledge memory section 35 is applied to the inference section 36.

The inference section 36 operates to collectively determine most suitable servo reference voltage control and applicable changes according to the status data 34 received from the status memory section 33 and the method 35a received from the knowledge memory section 35. An instruction value 36a for the most suitable control determined by the inference section 36 is applied to a servo reference voltage controller 37. The latter 37 applies servo reference voltage data 37a to the servo reference voltage setting unit 16.

The sections 33, 35 and 36 encircled by the broken line in FIG. 18 provides the instruction value 36a for most suitable servo reference voltage control, playing an essential part in the invention.

The operation of the embodiment thus organized; that is, an operation of forming the instruction value 36a for most suitable servo reference voltage control will be described.

FIG. 19 shows methods effective in performing the servo reference voltage control, methods I and II. These methods I and II can be readily and appropriately described by using the fuzzy set theory. For instance, the methods I and II can be stored in the knowledge memory section 35 in a rule form consisting of an IF front part and a THEN rear part according to a fuzzy set shown in FIG. 20.

Figure 20:
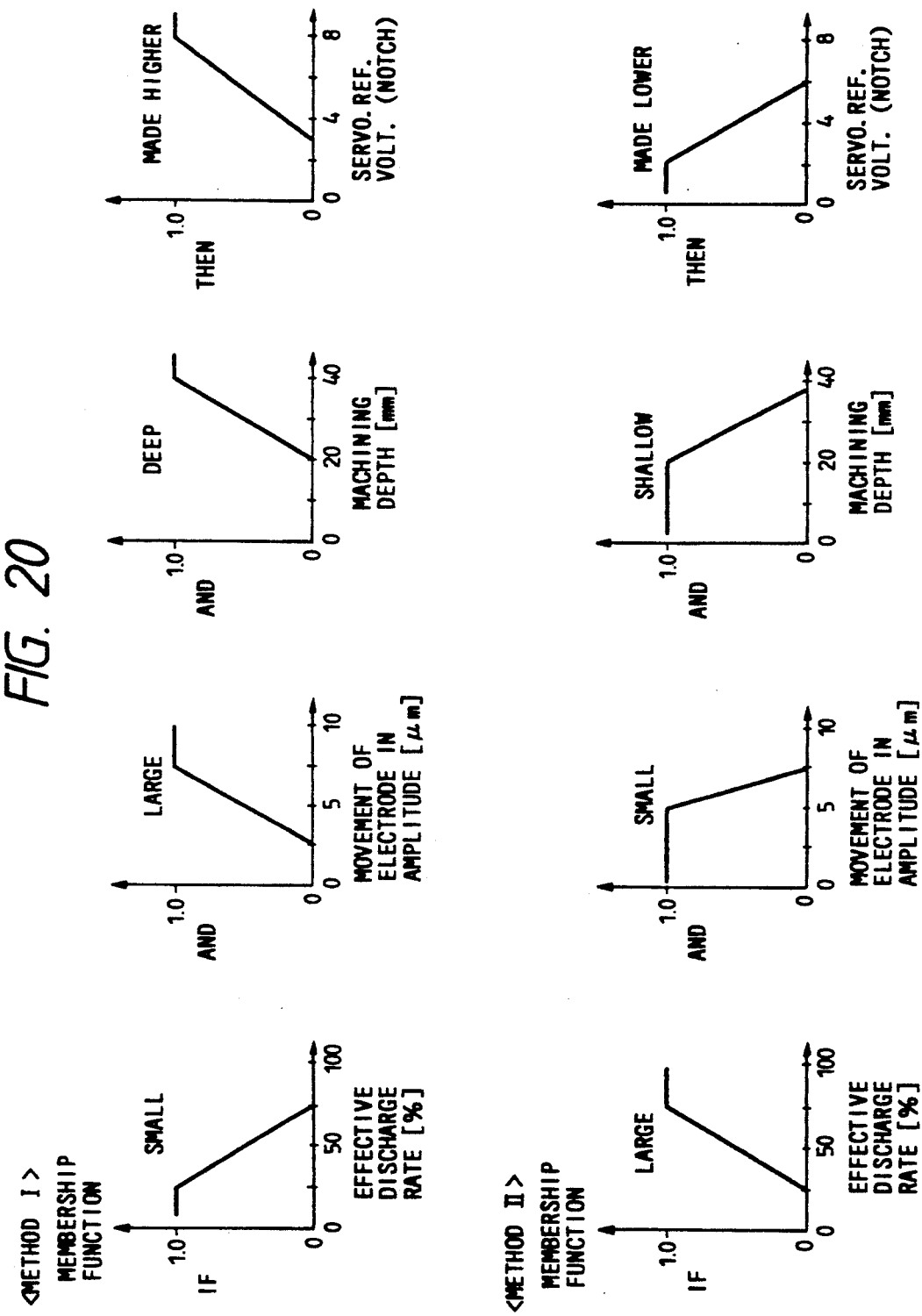
FIG. 20 is an explanatory diagram showing the methods of FIG. 9 which are described according to the fuzzy set theory.

More specifically, qualitative fuzzy expressions such as "effective electric discharge rate is low", "movement of an electrode during machining is large in amplitude", "machining depth is large" and "servo reference voltage is high" included in the method I, and "effective electric discharge rate is high", "movement of an electrode during machining is small in amplitude", "machining depth is small" and "servo reference voltage is low" included in the method II are described with membership functions as shown in FIG. 20.

For instance, the feature "effective electric discharge rate is small" in the method I is described as follows: When the effective electric discharge rate is 25% or less, then it fully satisfies the expression, and therefore the membership function is set to "1". When it is 75% or higher, it does not satisfy the expression at all, and therefore the membership function is set to "0". When it is larger than 25% and smaller than 75%, then it meets the expression with from "0" to "1", and therefore the membership function is set to "0-1". In the same manner, the qualitative, fuzzy expressions "movement of an electrode during machining is large in amplitude", "machining depth is large" and "servo reference voltage is high" included in the method I, and "effective electric discharge rate is high", "movement of an electrode during machining is small in amplitude", "machining depth is small" and "servo reference voltage is low" included in the method II can be appropriately and readily described by using membership functions.

On the other hand, the status detection value 32a is stored in the status memory section 33 which the status detector 32 provides by detecting the machining status data 31 required for the methods stored in the knowledge memory section 35.

In the case of FIG. 19, the status detection value includes an effective electric discharge rate, electrode amplitude, and machining depth.

The inference section 36 performs a fuzzy inference according to a procedure shown in FIG. 21 referring to the methods stored in the knowledge memory section 35 and the statuses stored in the status memory section 33, to determine an instruction value 36a for most suitable servo reference voltage control. In FIG. 21, reference characters 34a, 34b and 34c designate the detection values of "effective electric discharge rate", "amplitude in movement of an electrode during machining" and "machining depth" stored in the status memory section 33, respectively. For each of the methods I and II, the fuzzy inference is carried out as follows: It is determined to what extent these status data 34 satisfy the qualitative fuzzy expressions of the front part which are described with the membership functions. The membership function of the rear part is cut with the value of the membership function (the detection value 34a in the case of the method I, and the detection value 34c in the case of the method II) which, in the front part, is minimum in the degree of satisfaction, to determine the upper limit. Under this condition, the membership functions are combined so as to have the largest function values in them, and the area gravity center position C.G. of the resultant membership function is determined. The value of the position thus determined is the instruction value 36a for most suitable reference voltage control.

In the above-described embodiment, the methods effective in performing the servo reference voltage control are stored in the knowledge memory section 35, the machining status data required at least for the methods are stored in the status memory section 33, and the inference section 36 collectively determines the servo reference voltage instruction value referring to the methods and the machining status data. Therefore, the know how of a skilled person concerning the servo reference voltage control can be written correctly with ease. Furthermore, according to the methods, the servo reference voltage control can be performed optimumly, and can be automatically changed when required In the third embodiment shown in FIG. 21, the front part of each method describes three machining statuses, and the rear part one servo reference voltage control; however, the invention is not limited thereto or thereby. In addition, it goes without saying that, even when the number of methods is increased, similarly an instruction value for most suitable servo reference voltage control can be obtained. Changing the servo reference voltage according to the degree of instability of electric discharge machining conditions has not been described; however, it can be realized by utilizing the above-described technical concept of the invention in the same manner.

In the above-described third embodiment, the fuzzy set is utilized for the knowledge memory section, and the fuzzy inference is performed by the inference section. However, it goes without saying that knowledge expressions and inference methods employed in other general expert systems can be utilized, with the same effects as in the above-described embodiment.

FIGS. 22 through 25 show a fourth example of the electric discharge machining control apparatus which performs a speed gain control operation to maintain optimum electric discharge machining conditions, and to maximize an electric discharge machining efficiency.

FIG. 22 shows the entire arrangement of the apparatus. In FIG. 22, reference numeral 1 designates an electric discharge machining process including an electric discharge phenomena; 2, status data provided by the electric discharge machining process 1; and 4, a status detector for detecting the status data 2, to output a detection value 5 which is applied to an arithmetic section 46. In the section 46, servo voltage instruction value and the detection value 5 are subjected to arithmetic operation. The output of the arithmetic section 46 is applied to an amplifier 45. Further in FIG. 22, reference numeral 44 designates a speed gain setting unit for setting a feed speed gain for an electric discharge machining operation. A set value 44a provided by the setting unit 44 is applied to the amplifier 45. In the amplifier 45, the arithmetic output "A" (46a) of the arithmetic section 46 is amplified with the speed gain value "K" (44a) set by the speed gain setting unit 44 as an amplification factor, to provide an output 45a {"$A_K$(=KA)}, which is applied to an electrode control system 43. The latter 43 drives the electrode according to the signal (45a) applied thereto, to adjust the response speed of the electrode.

The electric discharge machining process 1 and the speed gain setting unit 44 provide machining status data 47 required for methods (cf. FIG. 19) effective in performing a speed gain control operation. The status data 47 are applied to a status detector 48.

The status detector 48 is to detect the machining status data required for the methods. The output of the status detector 48, namely, a status detection value 48a is stored in a status memory section 49. The status memory section 49 is to store at least one of the present and past status detection values 48a. Status data 50 read out of the status memory section 49 is applied to an inference section 51. Further in FIG. 22, reference numeral 52 designates a knowledge memory section for storing methods effective in performing the servo reference voltage control (cf. FIG. 23). A method 52a read out of the knowledge memory section 52 is applied to the inference section 51.

The inference section 51 operates to collectively determine most suitable servo reference voltage control and applicable changes according to the status data 50 received from the status memory section 49 and the method 52a received from the knowledge memory section 52. An instruction value 51a for the most suitable speed gain control determined by the inference section 51 is applied to a speed gain controller 53. The latter 53 applies speed gain data 53a to the speed gain setting unit 44.

The sections 49, 51 and 52 encircled by the broken line in FIG. 22 provides the instruction value 51a for most suitable speed gain control, playing an essential part in the invention.

The operation of the embodiment thus organized; that is, an operation of forming the instruction value 53a for most suitable speed gain control will be described.

FIG. 23 shows methods effective in performing the speed gain control, methods I, II, III and IV. These methods I through IV can be readily and appropriately described by using the fuzzy set theory. For instance, the methods I through IV can be stored in the knowledge memory section 52 in a rule form consisting of an IF front part and a THEN rear part according to a fuzzy set shown in FIG. 24.

Figure 24:
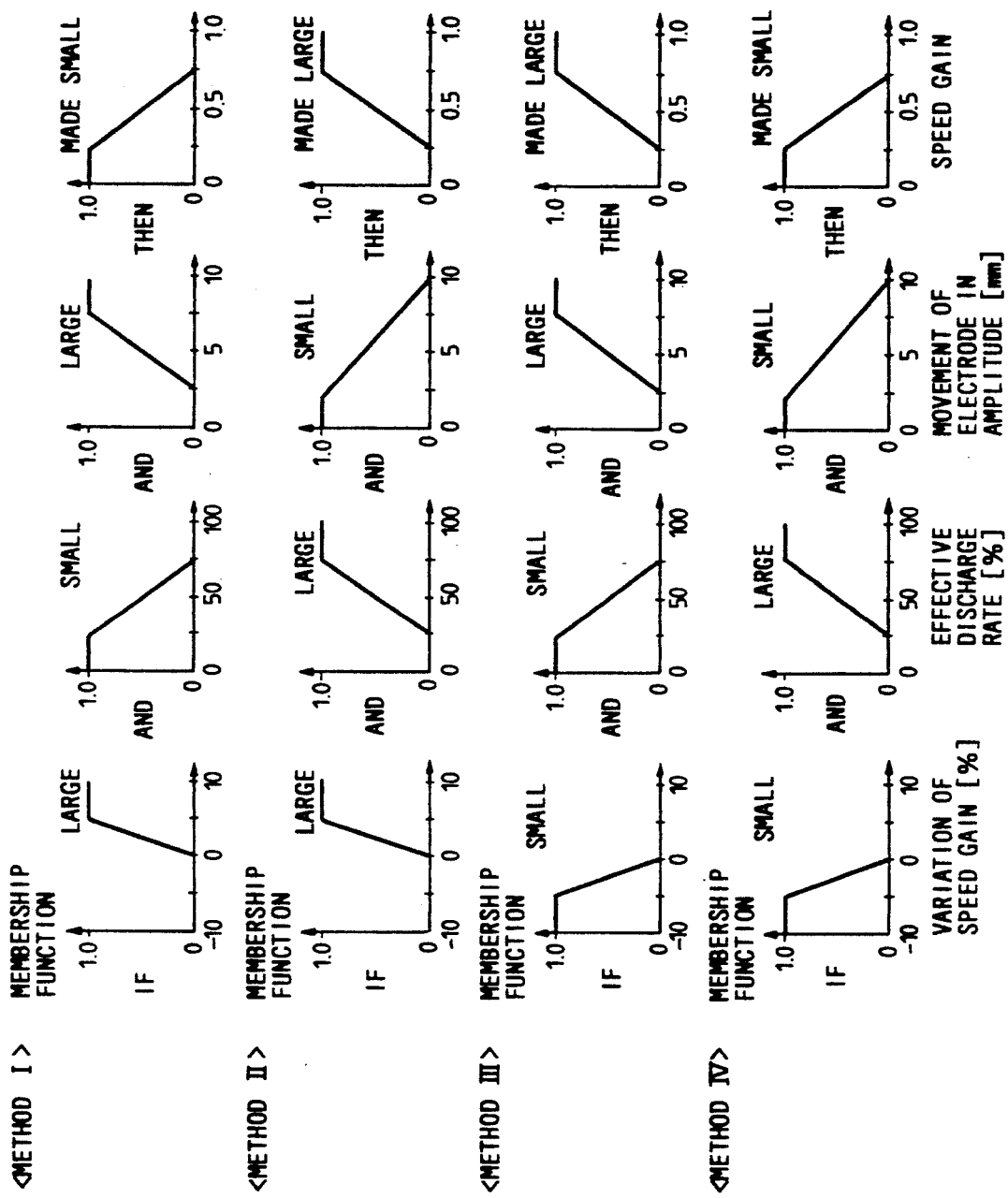
FIG. 24 is an explanatory diagram showing the methods of FIG. 23 which are described according to the fuzzy set theory.

More specifically, qualitative fuzzy expressions such as "speed gain is increased", "effective electric discharge rate is low", "movement of an electrode during machining is large in amplitude", and "speed gain is small" included in the method I; and "speed gain is increased", "effective electric discharge rate is high", "movement of an electrode during machining is small in amplitude", "speed gain is high" included in the method II; "speed gain is decreased", "effective electric discharge rate is low", "movement of an electrode during machining is large in amplitude", and "speed gain is high" included in the method III; and "speed gain is decreased", "effective electric discharge rate is high", "movement of an electrode during machining is small in amplitude", and "speed gain is low" included in the method IV are described with membership functions as shown in FIG. 24.

For instance, the feature "effective electric discharge rate is small" in the method I is described as follows: When the effective electric discharge rate is 25% or less, then it fully satisfies the expression, and therefore the membership function is set to "1". When it is 75% or higher, it does not satisfy the expression at all, and therefore the membership function is set to "0". When it is larger than 25% and smaller than 75%, then it meets the expression with from "0" to "1", and therefore the membership function is set to "0-1". In the same manner, the qualitative, fuzzy expressions "speed gain is increased", "movement of an electrode during machining is large in amplitude", and "speed gain is low" included in the method I; and "speed gain is increased", "effective electric discharge rate is high", "movement of an electrode during machining is small in amplitude", and "speed gain is low" included in the method II can be appropriately and readily described by using membership functions.

On the other hand, the status detection value 48a is stored in the status memory section 49 which the status detector 48 provides by detecting the machining status data 47 required for the methods stored in the knowledge memory section 52.

In the case of FIG. 23, the status detection value includes a speed gain variation, effective electric discharge rate, electrode amplitude, and machining gain.

Figure 25:
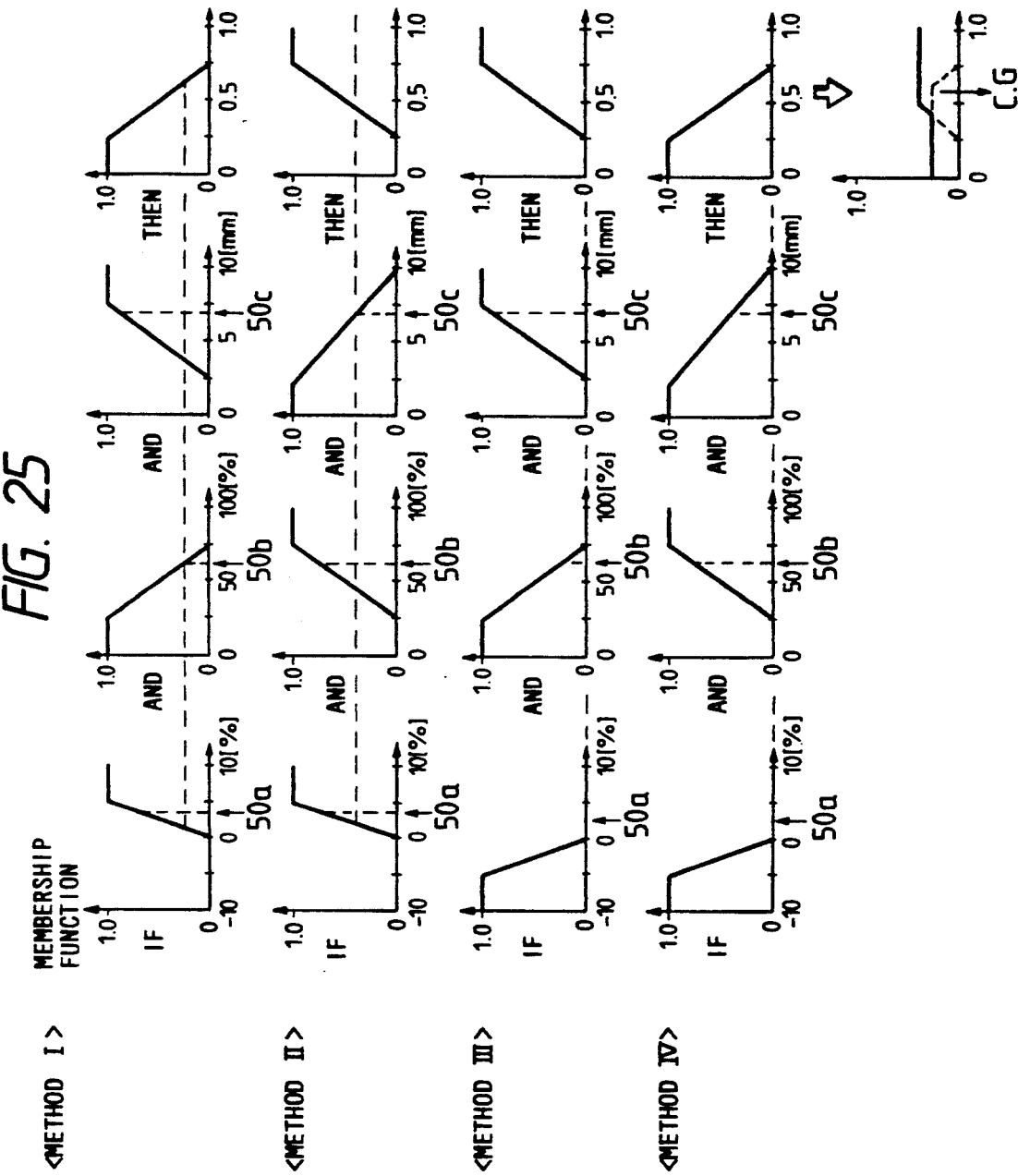
FIG. 25 is an explanatory diagram showing a fuzzy inference process of the methods shown in FIG. 23.

The inference section 51 performs a fuzzy inference according to a procedure shown in FIG. 25 referring to the methods stored in the knowledge memory section 52 and the status data stored in the status memory section 49, to determine an instruction value 51a for most suitable speed gain control. In FIG. 25, reference characters 50a, 50b and 50c designate the detection values of "variation in speed gain", "effective electric discharge rate", and "amplitude in movement of an electrode during machining" stored in the status memory section 49, respectively. For each of the methods I and II, the fuzzy inference is carried out as follows: It is determined to what extent these status data 50 satisfy the qualitative fuzzy expressions of the front part which are described with the membership functions. The membership function of the rear part is cut with the value of the membership function (the detection value 50a in the case of the method I, and the detection value 50c in the case of the method II) which, in the front part, is minimum in the degree of satisfaction, to determine the upper limit. Under this condition, the membership functions are combined so as to have the largest function values of them, and the area gravity center position C.G. of the resultant membership function is determined. The value of the position thus determined is the instruction value 36a for most suitable reference voltage control.

In the above-described embodiment, the methods effective in performing the speed gain control are stored in the knowledge memory section 52, the machining status data required at least for the methods are stored in the status memory section 49, and the inference section 51 collectively determines the servo reference voltage instruction value referring to the methods and the machining status data. Therefore, the know how of a skilled person concerning the speed gain control can be written correctly with ease. Furthermore, according to the methods, the speed gain control can be performed optimumly, and can be automatically changed when required.

In the fourth embodiment shown in FIG. 25, the front part of each method describes three machining statuses, and the rear part one speed gain control; however, the invention is not limited thereto or thereby. In addition, it goes without saying that, even when the number of methods is increased, similarly an instruction value for most suitable speed gain control can be obtained. Changing the speed gain according to the degree of instability of electric discharge machining conditions has not been described; however, it can be realized by utilizing the above-described technical concept of the invention in the same manner.

In the above-described fourth embodiment, the fuzzy set is utilized for the knowledge memory section, and the fuzzy inference is performed by the inference section. However, it goes without saying that knowledge expressions and inference methods employed in other general expert systems can be utilized, with the same effects as in the above-described embodiment.

As was described above, in the electric discharge machining control apparatus according to the invention, the methods effective in controlling machining conditions such as a pause time, electric discharge duration, servo reference voltage and speed gain are stored in the knowledge memory means, and the machining status data required at least for the methods are detected and stored in the status memory means, and the inference section collectively determines the instruction values for the machining conditions according to the methods and machining status data stored in the memory means. Hence, with the apparatus, the know how of a skilled person to control machining conditions such as a pause time, electric discharge duration, servo reference voltage and speed gain most suitably can be described with ease. Furthermore, according to the methods, the control of the machining conditions can be performed optimumly, and can be automatically changed when required.

What is claimed is:

1. An electric discharge machining control apparatus comprising:
   control means for controlling at least one machining condition in an electric discharge machining operation;
   knowledge memory means for storing methods effective in allowing said control means to control said machining condition;
   status detecting means for detecting machining status data from an electric discharge machining process
   status memory means for storing at least one of the present and past machining status data detected by said status detecting means; and
   inference means for combining a plurality of results which are obtained from machining status data read out of said status memory means and methods read out of said knowledge memory means in association with said machining status data thus read, to provide an instruction value for the control of said machining condition by said control means.

2. An apparatus as claimed in claim 1 wherein said control means controls at least one of a pause time, an electric discharge duration, a servo reference voltage and a feed speed in an electric discharge machining operation.

3. An electric discharge machining control apparatus as claimed in claim 1, in which said knowledge memory means comprises a knowledge memory section in which methods effective in performing pause time control, electric discharge duration control, and servo reference voltage control are stored in a rule form consisting of a first part in which conditions to be determined are described and a second part in which contents to be performed when said conditions are satisfied or not satisfied are described.

4. An electric discharge machining control apparatus as claimed in claim 2, in which said knowledge memory means comprises a knowledge memory section in which methods effective in performing pause time control, electric discharge duration control, and servo reference voltage control are stored in a rule form consisting of a first part in which conditions to be determined are described and a second part in which contents to be performed when said conditions are satisfied or not satisfied are described.

5. An electric discharge machining control apparatus as claimed in claim 3, wherein said knowledge memory section expresses the first and second parts of part or all of said rule forms according to a fuzzy set, and stores said expressions and membership functions corresponding thereto with respect to the fuzzy set, and said inference means combines the plurality of results by fuzzy composition.

* * * * *